(12) United States Patent
Plenderleith et al.

(10) Patent No.: US 11,347,808 B1
(45) Date of Patent: May 31, 2022

(54) DYNAMICALLY-ADAPTIVE BLOOM-FILTER

(71) Applicant: Amazon Technologies, Inc., Seattle, WA (US)

(72) Inventors: Jamie Plenderleith, Dublin (IE); Monika Marta Gnyp, Maynooth (IE)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 16/207,959

(22) Filed: Dec. 3, 2018

(51) Int. Cl.
*G06F 16/9035* (2019.01)
*G06F 16/901* (2019.01)

(52) U.S. Cl.
CPC ...... *G06F 16/9035* (2019.01); *G06F 16/9014* (2019.01); *G06F 16/9017* (2019.01)

(58) Field of Classification Search
None
See application file for complete search history.

(56) References Cited

U.S. PATENT DOCUMENTS

| | | | | |
|---|---|---|---|---|
| 8,239,394 B1 * | 8/2012 | Hogue | ............... | G06F 16/9014 707/754 |
| 8,972,337 B1 * | 3/2015 | Gupta | ................. | G06F 16/221 707/602 |
| 2009/0187546 A1 * | 7/2009 | Hamilton Whyte | .. | H04L 9/3236 |
| 2013/0132408 A1 * | 5/2013 | Little | ................ | G06F 16/2255 707/754 |
| 2015/0372910 A1 * | 12/2015 | Janakiraman | ............ | H04L 45/74 370/392 |
| 2019/0026221 A1 * | 1/2019 | Bar-Joshua | ......... | G06F 12/0864 |
| 2019/0370374 A1 * | 12/2019 | Carter | ................ | G06F 16/2255 |

* cited by examiner

*Primary Examiner* — Polina G Peach
*Assistant Examiner* — Anugeetha Kunjithapatham
(74) *Attorney, Agent, or Firm* — Klarquist Sparkman, LLP

(57) ABSTRACT

Technologies are provided for dynamically adaptive Bloom filters. After processing a lookup operation using a Bloom filter, a feedback message is received which can be used to determine whether the Bloom filter produced a false-positive lookup result. A Bloom filter accuracy score can be updated based on the feedback message. If the accuracy score for the Bloom filter falls below a specified threshold then the Bloom filter can be changed, or replaced with a different Bloom filter. In at least some embodiments, a plurality of Bloom filters can be created. One of the Bloom filters, designated as an active Bloom filter, can be used to process lookup operations. When a feedback message is received, accuracy scores can be updated for each of the Bloom filters. Based on the accuracy scores, the active Bloom filter can be deactivated and another Bloom filter, with a better accuracy score, can be activated.

17 Claims, 7 Drawing Sheets

DYNAMICALLY-ADAPTIVE BLOOM-FILTER

BACKGROUND

Bloom filters are data structures that can be used to test whether a given data item is a member of a set of data items. A Bloom filter comprises a bit array and is associated with one or more hash functions. To add a data item to the Bloom filter, the data item is hashed using the one or more hash functions. The one or more hash functions are used to map the data item to one or more positions within the bit array. These one or more bit array positions are used to identify the data item within the bit array, and are sometimes referred to as a "key" for the data item. To add an entry for the data item to the Bloom filter, the one or more identified positions within the bit array are assigned "positive" values (such as a Boolean 1). This process of producing a key for a data item, and adding the key to the bit array, can be performed for each data item in a set of data items. To subsequently determine whether a given data item exists in the set of data items, a key can be produced for the data item using the one or more hash functions for the Bloom filter. If any of the one or more bit array positions identified by the key do not contain positive values, then the given data item does not have an entry in the Bloom filter and, thus, does not exist in the set of data items. This can be referred to as a "negative" lookup result. If all of the mapped bit positions contain positive values, then the data item may exist in the set of data items. This can be referred to as a "positive" lookup result.

Due to the potential for at least some hash functions to cause collisions (scenarios where two different data items result in the same hashed value), it is possible that the given data item will map to a positive lookup result, but not exist in the set of data items. This can be referred to as a "false-positive" lookup result. Thus, it is possible for Bloom filters to provide false-positive lookup results for at least some data items.

DETAILED DESCRIPTION

Figure 1:
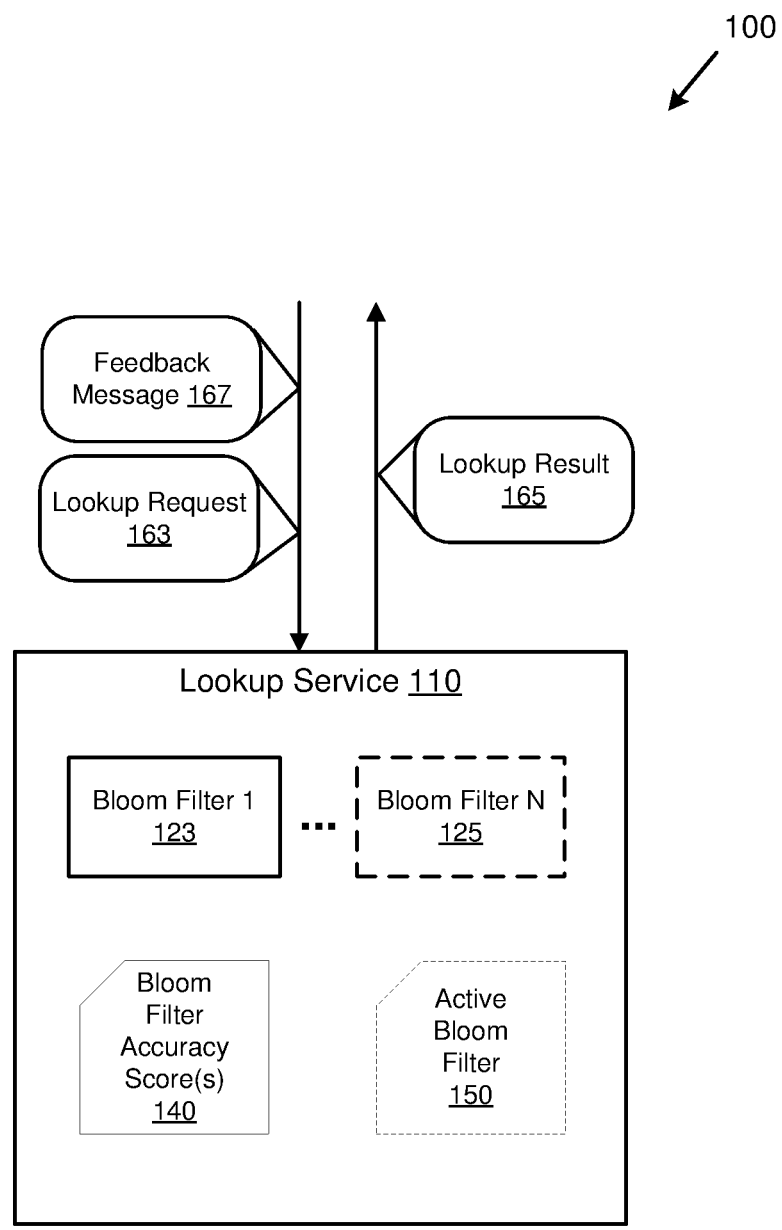
FIG. 1 is a system diagram depicting an example system comprising a dynamically adaptive Bloom filter.

A Bloom filter can be used to test whether a given data item is potentially a member of a set of data items. Example applications of Bloom filters include: determining whether a record exists in a datastore (such as a database), determining whether a given record (or file, etc.) has been previously accessed or requested, determining whether a given data item is present in a cache, determining whether a user has already read a given document, etc. However, due to the possibility of hash collisions, there is a risk that, for at least some data items, a Bloom filter will produce false-positive lookup results—results where the Bloom filter incorrectly reports that a given data item exists in a data set. In at least some cases, the risk of encountering false-positive lookup results can increase proportionally to the number of data items that are added to the Bloom filter. Thus, as the size of a given data set increases, the accuracy of lookup operations for a Bloom filter populated using the data set may decrease.

In at least some cases, the risk of producing false-positive lookup results can be mitigated by adjusting various parameters of the Bloom filter, such as the type of hash function that is used, the number of hash functions that are used, the number of bits stored in the bit array, etc. Different hash functions, numbers of hash functions, and/or bit array lengths may produce better or worse results for different data sets. However, it is difficult to know ahead of time how a given Bloom filter will perform for a given data set.

At least some of the embodiments of the technologies described herein solve these problems by tracking an accuracy score for a Bloom filter and dynamically adapting the Bloom filter based on the accuracy score. After processing a Bloom filter lookup request, a feedback message can be received that can be used to determine whether the Bloom filter produced a false-positive lookup result. An accuracy score for the Bloom filter can be updated based on the feedback message. If the accuracy score for the Bloom filter falls below a specified threshold (for example, due to the production of an unacceptable number of false-positive lookup results) then the Bloom filter can be changed, or replaced with another Bloom filter that uses a different set of Bloom filter parameters.

In a different or further embodiment, a plurality of Bloom filters can be created using various combinations of Bloom filter parameters. Each of the plurality of Bloom filters can be populated using data items in a same data item set. One of the plurality of Bloom filters can be designated as an active Bloom filter, which is used to process lookup requests. In at least some embodiments, additional Bloom filters, of the plurality of Bloom filters, are also used to produce lookup results for a received request. However, these results may not be reported to a requestor. When a feedback message is received, accuracy scores can be updated for each of the plurality of Bloom filters that produces a lookup result. If an accuracy score for the active Bloom filter falls below a specified threshold (or another of the Bloom filters has a better accuracy score) then the active Bloom filter can be deactivated and another of the plurality of Bloom filters can be activated. Thus, over the course of multiple lookup requests, a Bloom filter, of the plurality of Bloom filters, that is best suited for use with the set of data items can be identified and used to process subsequent lookup requests.

FIG. 1 is a system diagram depicting an example system 100 comprising a lookup service 110 comprising a dynamically adaptive Bloom filter. The lookup service 110 comprises one or more Bloom filters 123-125 and one or more accuracy scores 140 for the one or more Bloom filters 123-125. The lookup service 110 can be configured to track a designation of one of the one or more Bloom filters 123-125 as an active Bloom filter. In at least some embodiments, this designation can be tracked using an indicator 150, such as a flag, bit-field, variable, etc. For example, the indicator 150 can comprise an identifier associated with one of the one or more Bloom filters 123-125 that has been designated as the active Bloom filter.

The lookup service 110 is configured to receive a Bloom filter lookup request 163. The lookup service 110 is configured to process the lookup request 163 using the one or more Bloom filters 123-125. For example, the one or more Bloom filters 123-125 can be used as an index for records in a record set (such as database records in a database table, etc.). The one or more Bloom filters 123 can be populated by hashing record identifiers for the records in the record set using a hash function is associated with the one or more Bloom filters 123-125. The lookup request 163 can comprise a record identifier for a record that may or may not be in the record set. The lookup service 110 can use the one or more Bloom filters 123-125, and the record identifier, to generate a Bloom filter lookup result 165. The Bloom filter lookup result 165 can indicate whether or not a record associated with the record identifier received in the lookup request 163 is potentially in the record set.

For example, the lookup service 110 can determine whether a record associated with the record identifier is potentially in the record set using the Bloom filter 123. The lookup service 110 can hash the record identifier using one or more hash functions is associated with the Bloom filter 123 in order to produce a key (e.g., a set of index values) that is mapped to one or more positions in a bit array of the Bloom filter 123. If the positions in the bit array to which the key is mapped all contain positive values (e.g., a Boolean value of 1), then the lookup service 110 can generate a Bloom filter lookup result that indicates that the record associated with the record identifier is potentially in the record set. This result can be regarded as a "positive" lookup result. If at least one of the positions in the bit array to which the key is mapped contains a negative value (e.g., a Boolean value of 0), then the lookup service 110 can generate a Bloom filter lookup result that indicates that the record associated with the record identifier is not in the record set. This result can be regarded as a "negative" lookup result.

As mentioned above, a positive lookup result for a Bloom filter can only indicate that a given record is potentially in the record set. This is because, due to the nature of hash functions, it is possible for a Bloom filter to report false-positives lookup results. For example, the one or more hash functions for the Bloom filter 123 may hash two different record identifiers to a same key. In that situation, the Bloom filter 123 will indicate that records associated with both record identifiers are in the record set, even when one of the records may not be in the record set. In at least some scenarios, increasing the number of records tracked by a Bloom filter increases the likelihood that false-positives will occur. For example, as more entries are added to the Bloom filter, the percentage of positions in the bit array of the Bloom filter that contain positive values is likely to increase. This can make it statistically more likely that the positions in the bit array to which a given key is mapped will all contain positive values. Thus, if the Bloom filter lookup result 165 is a positive lookup result, it is possible that the result is a false-positive—meaning that the record associated with the record identifier is not actually in the record set even though the lookup result 165 indicates that it is in the record set.

The lookup service 110 is configured to receive a feedback message 167, indicating whether the record associated with the record identifier is actually in the record set. For example, in a scenario where the lookup result 165 indicates that the record is potentially in the record set, a client receiving the lookup result 165 may attempt to retrieve the record from the record set. The feedback message 167 can indicate whether the attempt to retrieve the record from the record set was successful or unsuccessful. In at least some embodiments, the feedback message to 167 can be transmitted to the lookup service 110 by a client which received at the lookup result 165. Alternatively, the feedback message 165 can be received from a server-side component (such as a data access service configured to retrieve records from the record set).

The feedback message 167 can be correlated with the lookup request 163 in a variety of ways. In at least one embodiment, the lookup request 163 comprises a request identifier that can be used to uniquely identify the request (such as an incremented request counter, a globally unique identifier, etc.). The lookup service 110 can be configured to store the request identifier in association with the Bloom filter lookup result 165. The feedback message 167 can also contain the request identifier. After receiving the feedback message 167, the lookup service 110 can retrieve the Bloom filter lookup result 165 using the request identifier received in the feedback message 167. The feedback message 167 can then be used to determine whether the stored Bloom filter lookup result 165 was a false-positive.

Alternatively, the feedback message 167 can comprise the record identifier that was previously transmitted as part of the lookup request 163. The lookup service 110 can use the record identifier contained in the feedback message 167 to generate another Bloom filter lookup result using the one or more Bloom filters 123-125. The lookup service 110 can then use the feedback message 167 to determine whether the generated Bloom filter lookup result is a false-positive. Alternatively, the feedback message 167 may only comprise an indicator that the lookup result 165 was a false-positive. In a scenario where the lookup service 110 contains a single Bloom filter (or reports the lookup result 165 of a single, active Bloom filter) then, upon receipt of the feedback message 167, the lookup service 110 can determine that the single (or active) Bloom filter generated a false-positive.

The lookup service 110 updates the one or more accuracy scores 140 based on the feedback message. For example, in an embodiment where the Bloom filter 123 indicated that the record associated with the record identifier was potentially in the record set, an accuracy score associated with the Bloom filter 123 can be updated. If the feedback message 167 indicates that the record is, in fact, in the record set then the accuracy score for the Bloom filter 123 can be increased. If the feedback message 167 indicates that the record is, in fact, not in the record set then the accuracy score for the Bloom filter 123 can be decreased. In at least some embodiments, a Bloom filter accuracy score can be based, at least in part, on a false-positive rate for the associated Bloom filter.

In a different or further embodiment, the accuracy score for a Bloom filter can be based on a false-positive rate of the Bloom filter and an average response time of the Bloom filter. For example, the lookup service 110 can track an average response time for the Bloom filter 123. A value of the accuracy score associated with the Bloom filter 123 can be based, not only on a rate at which the Bloom filter 123 reports false-positives, but also on the speed with which the Bloom filter 123 can be used to generate a Bloom filter lookup result. Various factors can impact the response time for a Bloom filter, such as the number of hash functions used to generate a key, the type of hash function(s) used to generate the key, the size of the bit array of the Bloom filter, etc.

In a different or further embodiment, adjustment can be made to the Bloom filter 123 based on the updated accuracy score. For example, if the accuracy score falls below a specified threshold, the Bloom filter 123 can be reconstructed using a different sized bit array, a different number of hash functions, a different type of hash function, or some combination thereof.

In embodiments where the lookup service 110 comprises a plurality of Bloom filters 123-125, the lookup service 110 can designate one of the Bloom filters as an active Bloom filter. For example, the lookup service 110 can associate identifiers with the plurality of Bloom filters 123-125 (such as index values, globally unique identifiers, etc.). The lookup service 110 can comprise an active Bloom filter indicator 150 that stores the identifier for the active Bloom filter. Bloom filters other than the active Bloom filter can be designated as "inactive" Bloom filters. Upon receipt of the lookup request 163, the lookup service 110 can generate lookup results for each of the plurality of Bloom filters 123-125. Upon receipt of the feedback message 167, the lookup service 110 can update the accuracy scores 140 for the plurality of Bloom filters 123-125.

In at least some embodiments, the lookup service 110 can analyze the updated Bloom filter accuracy scores 140 and determine that one of the inactive Bloom filters is more accurate than the active Bloom filter. For example, the lookup service 110 can determine that an inactive Bloom filter has a lower false-positive rate than the active Bloom filter. The lookup service 110 can then deactivate the active Bloom filter and activate the inactive Bloom filter. For example, in a scenario where the Bloom filter 123 is the active Bloom filter, the lookup service 110 can look up the record identifier contained in the lookup request 163 in each of the Bloom filters 123-125. The lookup service 110 can store the lookup results for each of the plurality of Bloom filters 123-125, but the lookup result 165 is the result generated using the active Bloom filter 123. After receiving the feedback message 167, the lookup service 110 can update the accuracy scores 140 for each of the Bloom filters 123-125 using the feedback message 167 and the stored lookup results for each of the Bloom filters 123-125. Based on the updated accuracy scores 140, the lookup service 110 can determine that the Bloom filter 125 has a higher accuracy score than the active Bloom filter 123. The lookup service 110 can then update the active Bloom filter indicator 150 to indicate that the Bloom filter 125 is now the active Bloom filter. A subsequent lookup request that is received at the lookup service 110 can be handled as outlined above, except that the lookup result transmitted in response will be a lookup result generated with the now-active Bloom filter 125, instead of the Bloom filter 123.

Thus, the Bloom filter, of the plurality of Bloom filters 123-125, that is used to report lookup results can be changed over time as received lookup requests (e.g., 163), and associated feedback messages (e.g., 167), prove one of the plurality of Bloom filters 123-125 to be the most accurate for the record set. In at least some embodiments, the plurality of Bloom filters 123-125 can be associated with different, randomly selected hash functions. For example, the number and/or type of hash function associated with each of the plurality of Bloom filters 123-125 can be determined on a random (or pseudo-random) basis. Additionally or alternatively, the bit arrays of at least some of the Bloom filters 123-125 can be of different lengths.

By using Bloom filters with different parameters (e.g., number of hash functions, type(s) of hash functions, bit array length, etc.), a Bloom filter that provides an acceptable false-positive rate (and/or acceptable average response time) for the record set can be determined. As lookup requests, and associated feedback messages, are received and accuracy scores for the plurality of Bloom filters are updated, Bloom filters with unacceptable accuracy scores can be discarded and a Bloom filter, of the plurality of Bloom filters, with a best accuracy score can be promoted to act as the active Bloom filter. In at least some embodiments, additional Bloom filters, based on different parameters sets, can be added based on the accuracy scores for the Bloom filters currently in use. For example, if one or more Bloom filters using a particular type of hash function are producing poor results, one or more new Bloom filters can be created using a different type of hash function. If the newly created one or more Bloom filters produce better results, the previous one or more Bloom filters can be discarded and the newly created one or more Bloom filters can be used instead. Additionally or alternatively, one or more of the plurality of Bloom filters can be dynamically reconstructed using one or more different parameters based on their associated accuracy scores.

In at least some scenarios, a feedback message 167 may not be necessary to identify a false-positive result generated by one of the plurality of Bloom filters 123-125. For example, if at least one of the plurality of Bloom filters 123-125 produces a negative lookup result for a given record identifier, it can be determined that each Bloom filter that produced a positive result for the given record identifier produced a false-positive. This determination can be made because, while a positive lookup result for a Bloom filter indicates that a given record is potentially in the record set, a negative lookup result for a Bloom filter indicates that the given record is definitely not in the record set. Thus, if at least one of the Bloom filters 123-125 generates a negative lookup result, it can be determined that the given record is not in the record set. Thus, any Bloom filter which has produced a positive result has generated a false-positive. In such a scenario, where at least one of the plurality of Bloom filters 123-125 generated a negative lookup result, the negative lookup result can be transmitted as the lookup result 165 (regardless of whether the negative lookup result was generated by the active Bloom filter) and the accuracy scores 140 for the plurality of Bloom filters 123-125 can be updated (e.g., reduced for Bloom filters that produced a positive result and increased for Bloom filters that produced a negative result) without needing to receive a feedback message 167.

The lookup service 110 can comprise one or more hardware and/or software components of a computing device. For example, the one or more Bloom filters 123-125, the one or more Bloom filter accuracy scores 140, and/or the active Bloom filter indicator 150 can be stored in a memory and/or storage of a computing device. In at least some embodiments, the lookup service 110 can be distributed across multiple computing devices. For example, in an embodiment where the lookup service 110 comprises a plurality of Bloom filters, the Bloom filters can be stored in multiple computing devices. In such an embodiment, a centralized point of entry (such as a gateway computing device, etc.) can be configured to store the Bloom filter accuracy scores 140 and the active Bloom filter indicator 150, and to receive the lookup request 163. Upon receipt of the lookup request 163, the centralized point of entry can transmit lookup requests to the separate computing devices storing the plurality of Bloom filters (e.g., via one or more computer network connections) and to receive lookup results for the plurality of Bloom filters from the separate computing devices. The centralized point of entry can be configured to transmit the lookup response 165 and to subsequently receive the feedback message 167 and update the accuracy scores 140.

Figure 2:
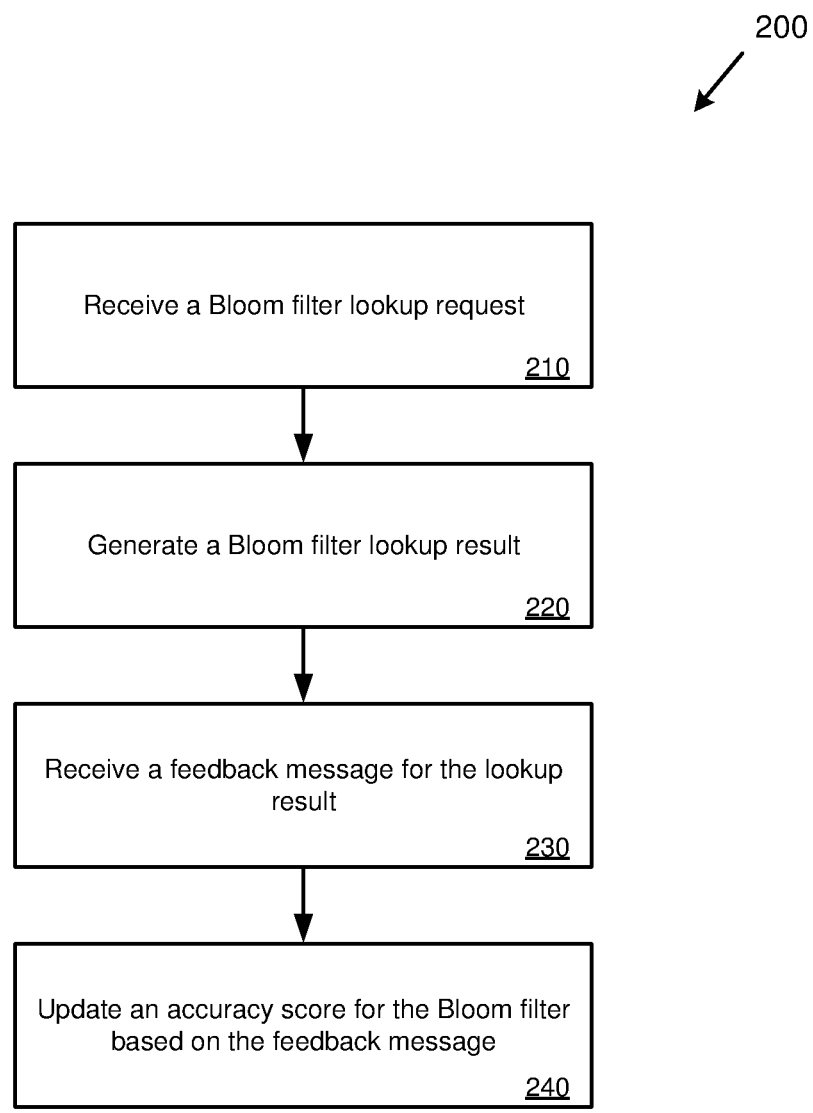
FIG. 2 is a flowchart of an example method for performing lookup operations using a dynamically adaptive Bloom filter.

FIG. 2 is a flowchart of an example method 200 for performing lookup operations using a dynamically adaptive Bloom filter. Any of the example systems described herein can be used to perform the example method 200. For instance, the example method 200 can be performed, at least in part, by the lookup service 110 depicted in FIG. 1.

At 210, a Bloom filter lookup request is received. For example, the Bloom filter lookup request can be received at the lookup service 110. The Bloom filter lookup request can be a request to determine whether a data item (such as a database record, etc.) is present in a set of data items (such as a database table, etc.). The Bloom filter lookup request can comprise an identifier for the data item. The request can be transmitted via one or more communication channels (such as wired communication channels, wireless communication channels, or some combination thereof). In at least some embodiments, the request is received via a computer network. In such an embodiment, the request can comprise one or more network data packets. In a particular embodiment, the request comprises a HyperText Transfer Protocol (HTTP) GET request. The request can be received at a publicly accessible endpoint (such as an application programming interface, network port, publicly-accessible URL, etc.).

At 220, a Bloom filter lookup result is generated. The Bloom filter lookup result is generated using one or more Bloom filters. For example, the Bloom filter 123 can be used to generate the result. Generating the result can comprise creating a key based on the identifier for the data item using one or more hash functions associated with the Bloom filter and then mapping the key to one or more positions in a bit array of the Bloom filter. The lookup result can then be transmitted in response to the lookup request. The lookup result can also be stored temporarily or permanently.

In at least some embodiments, multiple lookup results can be generated using multiple Bloom filters. For example, a lookup result can be generated using each of the plurality of Bloom filters 123-125. If all of the lookup results indicate that the identifier for the data item was not found (such as a scenario where each of the Bloom filters produces a negative lookup result), a response can be transmitted indicating that the data item associated with the data item identifier does not exist in the set of data items. In a scenario where some, but not all, of the Bloom filters indicate that the identifier for the data item was not found, a response can be transmitted indicating that the data item associated with the data item identifier does not exist in the set of data items, and accuracy scores for the Bloom filters that reported that the data item identifier was found can be decreased. (Additionally or alternatively, accuracy scores for Bloom filters that reported that the data item identifier was not found can be increased.) In a scenario where all of the Bloom filters indicate that the identifier for the data item was found, the response can be transmitted indicating that the data item associated with the data item identifier may exist in the set of data items.

It is possible for the Bloom filter lookup request to include a data item type (such as a record type, an object type, etc.) in addition to the data item identifier. In at least some embodiments, a plurality of Bloom filters can be associated with different data item types. For example, one or more of the Bloom filters 123-125 can be associated with one data item type, while another one or more of the Bloom filters 123-125 are associated with a different data item type. In such an embodiment, one or more Bloom filters can be selected on the basis of a data item type in the Bloom filter lookup request.

Different data item types can be associated with different kinds of data, such as different database tables, different data classes, etc. Different Bloom filters can be populated with data items from different data item sets associated with the different data item types. For example, one or more Bloom filters can be populated using records from one database table, while another one or more Bloom filters or populated using records from another database table. The Bloom filters can be populated using identifiers for the different types of data items. In at least some cases, different types of data items can have different kinds of identifiers. For example, the identifiers for two different types of data items may be of different lengths and/or hold different kinds of data. Thus, in at least some of these cases, different types of Bloom filters (e.g., Bloom filters having different numbers of hash functions, different types of hash functions, and/or different bit array lengths) can be better suited for indexing data items of different data types.

At 230, a feedback message for the Bloom filter lookup result is received. The feedback message indicates whether the data item associated with the data item identifier is actually present in the set of data items. In at least some embodiments, the feedback message can be received from a client device to which the Bloom filter lookup result was transmitted. In a scenario where the one or more Bloom filters reported that the data item identifier was found, a Bloom filter lookup result transmitted to the client can indicate that the data item associated with the data item identifier is present in the set of data items. If the client attempts to retrieve the data item and determines that the data item is not present in the set of data items, the client can transmit a feedback message, indicating that the Bloom filter lookup result is a false-positive. Additionally or alternatively, the feedback message can be received from a service, such as a server providing access to the set of data items (e.g., a database server). For example, after receiving a request from a client for a data item that is not present in the set of data items, the service can transmit a feedback message indicating that the one or more Bloom filters generated a false-positive result.

At 240, a Bloom filter accuracy score is updated based on the feedback message. The accuracy score can represent a level of reliability of the Bloom filter. For example, the accuracy score can be based on a ratio of a number of false-positive lookup results generated by the Bloom filter with respect to a total number of lookup results generated by the Bloom filter. The accuracy score can be inversely related to the false-positive ratio. Thus, the accuracy score can be decreased as the false-positive ratio for the Bloom filter increases. In an embodiment where a plurality of Bloom filters is used to generate lookup results, a separate accuracy score can be managed for each of the Bloom filters. Based on the accuracy scores of the Bloom filters, one of the Bloom filters can be designated as an active Bloom filter. The lookup result of the active Bloom filter can be the lookup result transmitted in response to the lookup request received at 210. Upon detection of a change to one or more of the accuracy scores, the active Bloom filter can be deactivated and another Bloom filter can be designated as the active Bloom filter.

Figure 3:
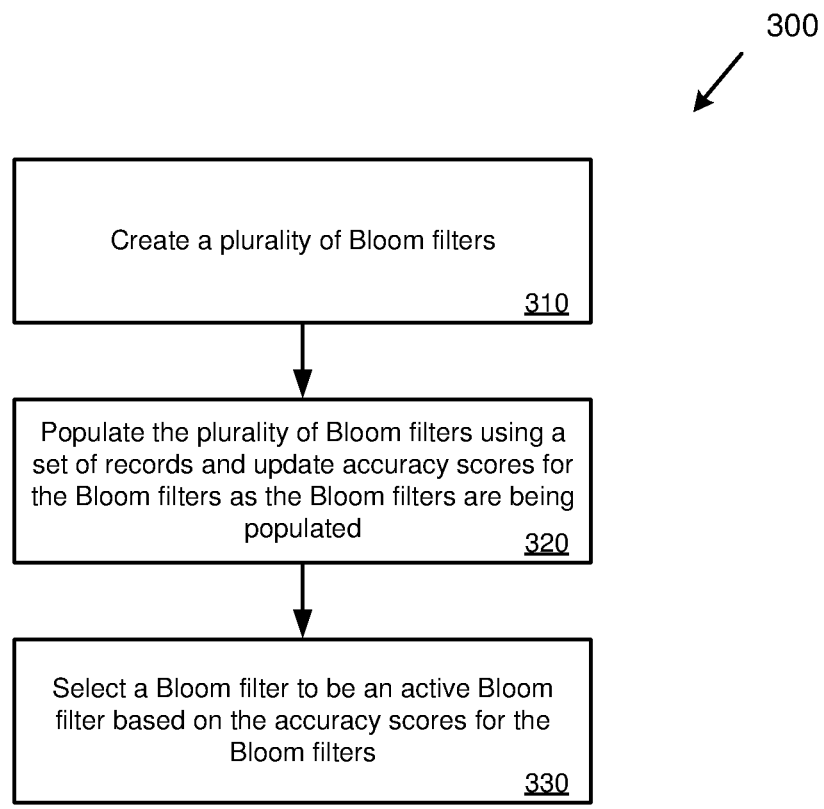
FIG. 3 is a flowchart of an example method for creating a dynamically adaptive Bloom filter.

FIG. 3 is a flowchart of an example method 300 for creating a dynamically adaptive Bloom filter. Any of the example systems described herein can be used to perform the example method 300. For instance, the example method 300 can be performed by the lookup service depicted in FIG. 1.

At 310, a plurality of Bloom filters is created. The plurality of Bloom filters can be associated with different hash functions. For example, at least some of the plurality of Bloom filters can be associated with the different types of hash functions (e.g., different types of cryptographic hash functions, different types of non-cryptographic hash functions, or some combination thereof). Additionally or alternatively, the plurality of Bloom filters can be associated with different numbers of hash functions. For example, one or more of the Bloom filters can be associated with one hash function, while another one or more of the Bloom filters are associated with two hash functions, and yet another one or more of the Bloom filters are associated with three hash functions. Different numbers of hash functions (four, five, six, etc.) are also possible. Additionally or alternatively, at least some of the plurality of Bloom filters can have bit arrays of different lengths. Increasing the number of hash functions and/or the bit array length for a Bloom filter may reduce the risk of false-positives for the Bloom filter. In at least some embodiments, the Bloom filter parameters (e.g., the number of hash functions to be used with the Bloom filter, the type of hash function for each of the hash functions to be used with the Bloom filter, and/or the number of bits in the bit array of the Bloom filter) for each of the plurality of Bloom filters can be randomly selected. The number of Bloom filters to be created can be specified ahead of time, generated randomly, and/or generated based on the results of previous Bloom filter creation operations.

The type of hash function(s) associated with the Bloom filter may also affect the risk of false-positives for the Bloom filter. However, increasing the number of hash functions and/or the bit array length may result in slower average response times for the Bloom filter. The type of hash function(s) associated with the Bloom filter may also affect the response rate of the Bloom filter. Different types of hash functions may produce higher or lower false-positive rates for different types of data.

At 320, the plurality of Bloom filters are populated using a set of records (such as a set of database records stored in a database table). The records are retrieved and used to create entries in the plurality of Bloom filters. Creating an entry in a Bloom filter for a given record comprises hashing an identifier for the record (such as an index value, a primary key value, a globally unique identifier, etc.) using the one or more hash functions associated with the Bloom filter to create a key for the record. The key represents one or more positions within the bit array for the Bloom filter to which the record identifier has been mapped by the one or more hash functions. To add an entry to the Bloom filter for the record, the one or more positions in the bit array identified by the key are set to positive values (such as a Boolean value of 1).

Accuracy scores for the Bloom filters are updated as the Bloom filters are being populated. For example, populating the plurality of Bloom filters with a record in the set of records can comprise, for each Bloom filter in the plurality of Bloom filters, checking the Bloom filter for the existence of the record. After the key has been generated for the record using the one or more hash functions for a given Bloom filter, the one or more positions in the bit array of the Bloom filter identified by the key can be inspected to determine whether or not all of the identified positions already contain positive values.

If all of the identified positions already contain positive values, then the given record represents a false-positive for the given Bloom filter in its current state. This is because the Bloom filter indicates that the record exists even though an entry for the record has not been expressly added to the Bloom filter. If the given Bloom filter generated a false-positive, then an accuracy score associated with the Bloom filter can be decreased.

If the given Bloom filter does not indicate that the record exists (e.g., because less than all of the identified positions in the bit array contain positive values) then an entry for the given record can be added to the given Bloom filter. In at least some embodiments, the accuracy score associated with the Bloom filter is also increased.

The process of checking for the existence of the given record, and then either decreasing the accuracy score for the Bloom filter or adding an entry for the record to the Bloom filter, is repeated for each of the plurality of Bloom filters. After the plurality of Bloom filters have been populated with all of the records in the set of records, the accuracy scores associated with the Bloom filters can reflect the number of false-positives detected for each of the respective Bloom filters for the given set of records.

At 330, a Bloom filter, of the plurality of Bloom filters, is selected to be an active Bloom filter based on the accuracy scores for the Bloom filters. For example, the Bloom filter with the highest accuracy score can be selected to be the active Bloom filter. In at least some embodiments, average response times for the Bloom filters can also be considered when selecting the active Bloom filter. As the Bloom filters are checked for the existence of the records as part of the Bloom filter population at 320, the average time that each Bloom filter takes to generate a lookup result can be tracked. Selecting the active Bloom filter can comprise identifying Bloom filters, of the plurality of Bloom filters, which have accuracy scores above a specified accuracy threshold, and then selecting, from among those Bloom filters, the Bloom filter with the lowest average response time.

In at least one embodiment, the records in the set of records are associated with a record type, of a plurality of record types. For example, in an embodiment where the set of records is a set of database records in a database table, the identity of the database table can represent a record type. In a different or further embodiment where the records comprise data objects that are instances of a given data class, an identifier of the data class can represent the record type. In such embodiments, the active Bloom filter can be marked as active for the record type associated with the set of records. The other Bloom filters, in the plurality of Bloom filters, can be marked as inactive for the record type.

The active Bloom filter can be used to process Bloom filter lookup requests for the set of records. For example, a request can be received to look up a record. The request can comprise a record identifier that can be used to check for the existence of the record in the plurality of Bloom filters. The record identifier can be used to check for the existence of the record using the active Bloom filter. In at least some embodiments, the existence of the record can be checked using one or more other Bloom filters, of the plurality of Bloom filters, as well. A response can be transmitted, indicating whether the record is in the set of records, based on the check of the active Bloom filter. Subsequently, a feedback message can be received, indicating whether the record actually exists in the set of records. The accuracy scores for the plurality of Bloom filters can be updated based on the feedback message. For example, if the feedback message indicates that the active Bloom filter generated a false-positive lookup result then the accuracy score for the active Bloom filter can be reduced. In at least some embodiments, based on the updated accuracy scores, the active Bloom filter can be marked as inactive and another Bloom filter, of the plurality of Bloom filters, can be selected to be the active Bloom filter. For example, after the accuracy scores for the plurality of Bloom filters have been updated, the accuracy score for the active Bloom filter may have fallen below a specified threshold. Additionally or alternatively, another Bloom filter may now have a higher accuracy score than the active Bloom filter. A Bloom filter having a higher accuracy score, and/or an accuracy score above the specified threshold, can be selected to act as the active Bloom filter for subsequently received lookup requests.

Figure 4:
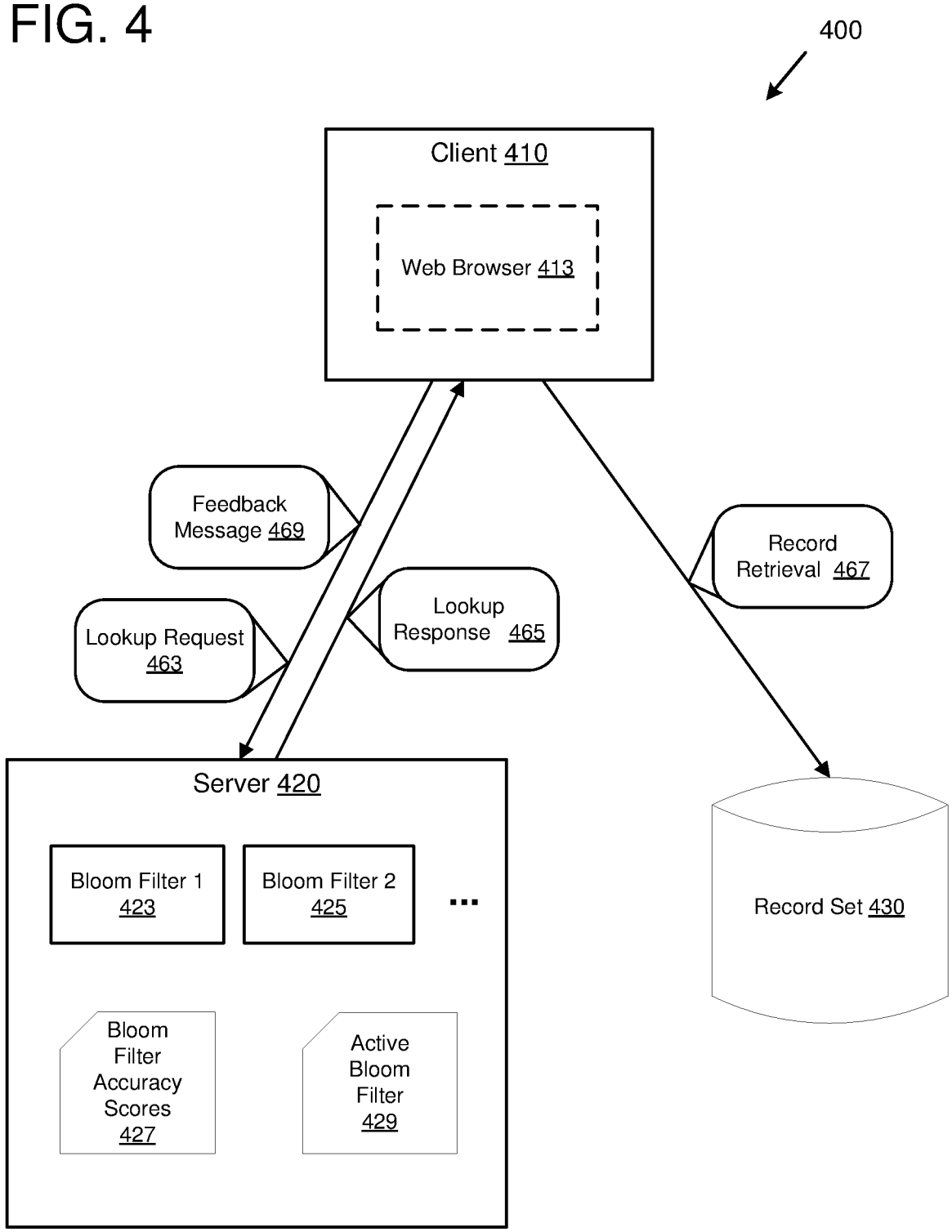
FIG. 4 is a system diagram depicting an example system comprising a client computing device and a server computing device comprising a dynamically adaptive Bloom filter.

FIG. 4 is a system diagram depicting an example system 400 comprising a client computing device 410 and a server computing device 420 comprising a dynamically adaptive Bloom filter.

The server computing device 420 comprises an active Bloom filter 423 and an inactive Bloom filter 425. The Bloom filters 423 and 425 are populated with entries based on records stored in a record set 430. For example, the record set 430 can be a database (or a table in a database). The Bloom filters 423 and 425 are associated with different hash functions. The different hash functions are used to generate the separate Bloom filters 423 and 425. In at least some embodiments, the server computing device 420 is configured to select the different hash functions at random. In a different or further embodiment, the Bloom filters 423 and 425 can be associated with different numbers of hash functions and/or bit arrays of different lengths. Although two Bloom filters 423 and 425 are depicted in FIG. 4, other numbers of Bloom filters are also possible. For example, the server computing device 420 can comprise an active Bloom filter 423 and a plurality of inactive Bloom filters (including the Bloom filter 425).

The server computing device 420 comprises Bloom filter accuracy scores 427 for the Bloom filters 423 and 425. The server computing device 420 further comprises an active Bloom filter indicator 429. The active Bloom filter indicator 429 identifies the Bloom filter 423 as the active Bloom filter.

The client computing device 410 is configured to transmit a lookup request 463 to the server computing device 420. The lookup request 463 can comprise a record identifier (such as an index value, a record key value, a globally unique identifier, etc.). The server computing device 420 is configured to receive the record lookup request 463 from the client computing device 410 and to perform a Bloom filter lookup operation using the record identifier and the active Bloom filter 423. The server computing device 420 also performs another Bloom filter lookup operation using the record identifier and the inactive Bloom filter 425. The lookup results generated by the active Bloom filter 423 and the inactive Bloom filter 425 can be stored by the server computing device 420. Based on the result of the Bloom filter lookup operation using the active Bloom filter 423, the server computing device 420 transmits a lookup response 465 to the client computing device 410, indicating whether the record associated with the record identifier does not exist in the record set 430, or potentially exists in the record set 430.

The client computing device 410 is configured to receive the lookup response 465 from the server computing device 420. If the lookup response 465 indicates that the record associated with the record identifier potentially exists in the record set 430, the client 410 can attempt to retrieve the record from the record set 430. For example, the client 410 can transmit a record retrieval request 467 to the record set 430 (or to a server or service acting as an intermediate interface for the record set 430. Since the lookup response 465 indicates only that the record potentially exists in the record set 430, it is possible that the record does not exist in the record set 430. Based on a response to the record retrieval request 467, the client computing device 410 can determine whether the record does or does not exist in the record set 430.

If the record does not exist in the record set 430, the client computing device 410 can transmit a feedback message 469 to the server computing device 420, indicating that the record does not exist in the record set 430. The server computing device 420 can be configured to receive the feedback message 469 from the client computing device 410. Based on the feedback message 469, the server computing device 420 can determine that the active Bloom filter 423 produced a false-positive lookup result. The server computer device 420 can then update the accuracy scores 427 associated with the active Bloom filter 423 and the inactive building filter 425. As subsequent lookup request, and associated feedback messages, are received, the accuracy scores 427 can be adjusted to reflect false-positive rates for the respective Bloom filters 423 and 425.

In at least some scenarios, the Bloom filter accuracy scores 427 can be adjusted without the receipt of a feedback message. For example, in a scenario where one of the Bloom filters produces a positive lookup result in the other Bloom filter produces a negative lookup result, it can be determined that the positive lookup result is a false-positive. Since the records in the record set 430 are used to populate each of the Bloom filters 423 and 425, if one of the Bloom filters produces a negative lookup result then the record associated with the record identifier does not exist on the record set 430. Thus, the result that indicates that the record does exist in the record set 430 is a false-positive. In such a scenario, the accuracy score for the Bloom filter that produced the false-positive lookup result can be decreased. The lookup response 465 transmitted to the client computing device 410 can indicate that the record does not exist in the record set 430.

Subsequent to a change to the accuracy scores 427, the server computing device 420 can determine that the accuracy score for the active Bloom filter 423 is below a specified threshold. Additionally or alternatively, the server computing device 420 can determine that the accuracy score for the inactive Bloom filter 425 is above the specified threshold and/or is greater than the accuracy score for the active Bloom filter 423. Based on the determining, the server computing device 420 can deactivate the active Bloom filter 423 and activate the inactive Bloom filter 425. Deactivating the active Bloom filter and activating the inactive Bloom filter can comprise changing the active Bloom filter identifier 429 to identify the Bloom filter 425 instead of the Bloom filter 423.

In at least one embodiment, the server computing device comprises a plurality of Bloom filters associated with record types, wherein the active Bloom filter 423 and the inactive Bloom filter 425 are associated with one of the record types. The record types can be associated with different record sets. The Bloom filters 423 and 425 can be associated with the record type associated with the record set 430. Other Bloom filters located in the server computing device 420 can be associated with different record types. In such an embodiment, the lookup request 463 can comprise a record type in addition to the record identifier. The server computing device 420 can determined that the record type in the lookup request 463 is the record type associated with the active Bloom filter 423 and the inactive Bloom filter 425. Based on the determining, the server computing device 420 can select the active Bloom filter 423 and the inactive Bloom filter 425 for processing the record lookup request 463 using the record type.

In a particular embodiment, the client computing device 410 comprises a web browser 413. One or more components of the web browser 413 can be configured to transmit the lookup request 463, receive the lookup response 465 from the server computing device 420, attempt to retrieve the record from the record set 430, determine that the record does or does not exist in the record set 430, and/or transmit the feedback message 469 to the server computing device 420. For example, the lookup request 463 can comprise an HTTP GET or POST request. The lookup response 465 can comprise an HTTP response to the HTTP GET or POST request. Retrieving the record from the record set 430 and the feedback message 469 can comprise additional HTTP GET and/or POST requests. The one or more components of the web browser 413 can comprise one or more webpages and/or executable scripts downloaded from a server (such as the server computing device 420). Additionally or alternatively, the one or more components of the web browser 413 can comprise one or more web browser plug-ins.

Figure 5:
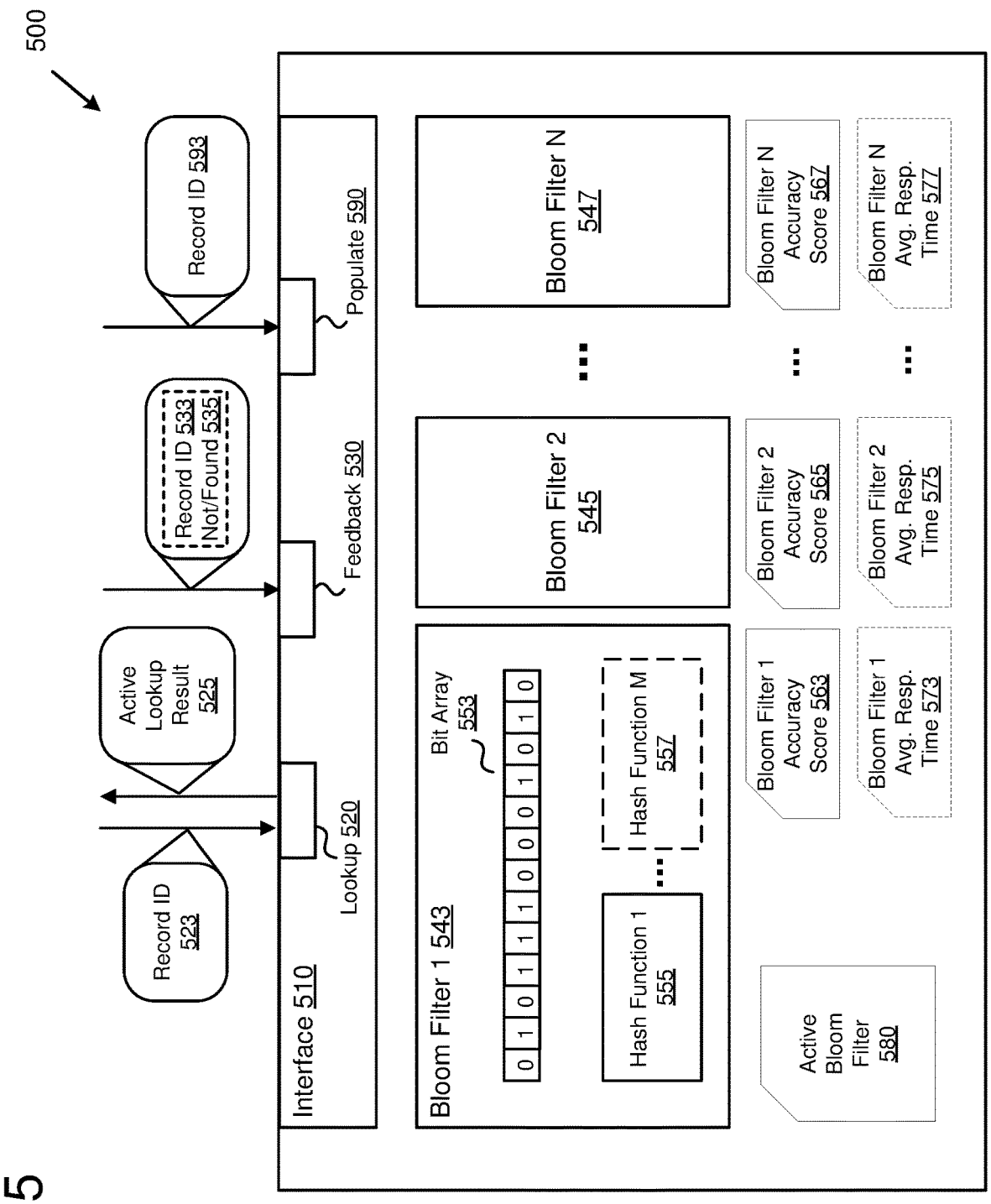
FIG. 5 is a diagram depicting an example dynamically adaptive Bloom filter.

FIG. 5 is a diagram depicting an example dynamically adaptive Bloom filter 500. The dynamically adaptive Bloom filter 500 can be used in any of the example systems described herein. For example, the dynamically adaptive Bloom filter 500 can be used in the lookup service 110, the server computing device 420, and/or the service 616 depicted in FIG. 6.

The dynamically adaptive Bloom filter 500 comprises a plurality of Bloom filters 543-547. Each of the Bloom filters 543-547 comprises a bit array and one or more hash functions. For example, the Bloom filter 543 is depicted in FIG. 5 as comprising a bit array 553 and one or more hash functions 555-557. In at least some embodiments, the Bloom filters 543-547 can comprise different hash functions and/or different numbers of hash functions. Additionally or alternatively, the bit arrays of the Bloom filters 543-547 can have different lengths. The dynamically adaptive Bloom filter 500 also comprises accuracy scores 563-567 associated with the Bloom filters 543-547, respectively. Optionally, the dynamically adaptive Bloom filter can further comprise average response times 573-577 associated with the Bloom filters 543-547, respectively. The dynamically adaptive Bloom filter 500 comprises an active Bloom filter identifier 580 which identifies a Bloom filter, of the plurality of Bloom filters 543-547, that is currently designated as the active Bloom filter.

The dynamically adaptive Bloom filter 500 comprises an interface 510 which can be used by external components to interact with the dynamically adaptive Bloom filter 500. The interface 510 comprises a lookup endpoint 520, a feedback endpoint 530, and a populate endpoint 590.

The lookup endpoint 520 can be used to determine whether a record potentially exists in a given record set. The lookup endpoint 520 can receive a record identifier 523 as input and can provide a lookup result 525 generated by the active Bloom filter as output. Upon receipt of the record identifier 523, the dynamically adaptive Bloom filter 500 can perform operations to look up the record identifier 523 in the active Bloom filter. The result of the lookup operations, indicating whether a record associated with the record identifier 523 does not exist in the record set, or potentially exists in the record set, is returned as the output 525. In at least some embodiments, the dynamically adaptive Bloom filter 500 performs operations to look up the record identifier in one or more additional Bloom filters as well.

The feedback endpoint 530 can be used to provide feedback to the dynamically adaptive Bloom filter 500 about the accuracy of the lookup result 525 returned by the lookup endpoint 520. The feedback endpoint 530 can take input that can be used by the dynamically adaptive Bloom filter 500 to determine whether one or more of the Bloom filters 543-547 generated a false-positive lookup result. For example, the feedback endpoint 530 can receive a record identifier 533 and a value 535 indicating whether or not the record associated with the identifier 533 could actually be located in the record set. The record identifier 533 can be used to determine which of the Bloom filters 543-547 were used to generate lookup results for the record identifier 533. In at least some scenarios, less than all of the Bloom filters 543-547 may be used to generate lookup results for a given record identifier. For example, in some embodiments only the active Bloom filter may be used to generate a lookup result. Alternatively, some, but less than all, of the Bloom filters 543-547 may be used to produce lookup results for a given record identifier. In such embodiments, a record identifier 523 can be stored by the dynamically adaptive Bloom filter 500 in association with the Bloom filters that were used to generate lookup results. In at least some such embodiments, the lookup results generated by the Bloom filters can also be stored in association with the record identifier 523.

Upon invocation of the feedback endpoint 530, the record identifier 533 can be used to identify the Bloom filters that were used to generate lookup results for the record identifier 533. The indicator 535 can then be used to determine whether or not the record associated with the record identifier 533 was found in the record set. If the record was not found in the record set, then the accuracy scores for the Bloom filters that produced positive lookup results for the record identifier 533 can be decreased. If the record was found in the record set, then, in at least some embodiments, the accuracy scores for the Bloom filters that produced positive lookup results for the record identifier 533 can be increased.

Alternatively, the feedback endpoint 530 can be defined to receive only the record identifier 533. In such an embodiment, a call to the feedback endpoint 530 can indicate that a false-positive lookup result was generated for the record identifier 533. For example, the accuracy scores 563-567 can be based on false-positive percentages for each of the Bloom filters 543-547. In such a scenario, feedback for true-positive lookup results may not be necessary since a ratio of false-positive lookup results to total lookup results can be computed for each of the Bloom filters 543-547 using the total number of invocations of the lookup endpoint 520 and the number of invocations of the lookup endpoint 520 that resulted in false-positives for a given Bloom filter.

Alternatively, the feedback endpoint 530 can be defined to receive no input parameters. In such an embodiment, a call to the feedback endpoint 530 can indicate that a false-positive lookup result was generated and the accuracy scores 563-567 for all the Bloom filters 543-547 should be reduced. For example, in an embodiment where lookup operations or performed for each of the Bloom filters 543-547, the dynamically adaptive Bloom filter 500 can be configured to return a positive lookup result from the lookup endpoint 520 only when all of the Bloom filters 543-547 generate positive lookup results. In such a scenario, if the record associated with the identifier 523 is found to not exist in the record set, then all of the Bloom filters 543-547 generated false-positive lookup results and there is no need to specify, by way of a record identifier 533, which of the Bloom filters 543-547 produced a false-positive. In such a scenario, upon invocation of the feedback in point 530, the dynamically adaptive Bloom filter 500 can decrease all of the accuracy scores 563-567.

After updating one or more of the accuracy scores 563-567, the dynamically adaptive Bloom filter 500 can analyze the accuracy scores 563-567 to determine whether the active Bloom filter should be changed. For example, due to false-positive lookup results, an accuracy score for the currently active Bloom filter may fall below a specified minimum accuracy threshold. Additionally or alternatively, an accuracy score for one of the inactive Bloom filters may have increased to a value greater than the accuracy score for the active Bloom filter. Upon such a determining, the dynamically adaptive Bloom filter 500 can update the active Bloom filter indicator 580 to identify a Bloom filter that has an accuracy score above the specified minimum accuracy threshold and/or has an accuracy score that is greater than the accuracy score for the currently active Bloom filter.

The populate endpoint 590 can be used to populate the Bloom filters 543-547 with entries for records in a given record set. The populate endpoint 590 can take a record identifier 593 as input. Upon invocation of the populate endpoint 590, the dynamically adaptive Bloom filter 500 can use the record identifier 593 to create an entry in each of the Bloom filters 543-547. The populate endpoint 590 can be invoked for each record in a given record set in order to populate the Bloom filters 543-547 for the given record set.

In at least some embodiments, the dynamically adaptive Bloom filter can be configured to update the accuracy scores 563-567 as the record identifier 593 is added to each of the Bloom filters 543-547. For example, after hashing the record identifier 593 using the one or more hash functions 555-557 to create a key based on the record identifier 593 for the Bloom filter 543, the dynamically adaptive Bloom filter 500 can inspect the one or more bits in the bit array 553 identified by the key. If all of the one or more identified bits contain positive values then the Bloom filter 543 has effectively created a false-positive lookup result, since it indicates that an entry already exists in the bit array 553 for the record identifier 593, even though it does not. Based on this, the accuracy score 563 for the Bloom filter 543 can be decreased.

In at least some embodiments, the endpoints 520, 530, and 590 of the interface 510 can be exposed via one or more services, such as one or more web services. In a particular embodiment, the endpoints 520, 530, and 590 are exposed as endpoints of a Representational State Transfer (REST) web service.

Figure 6:
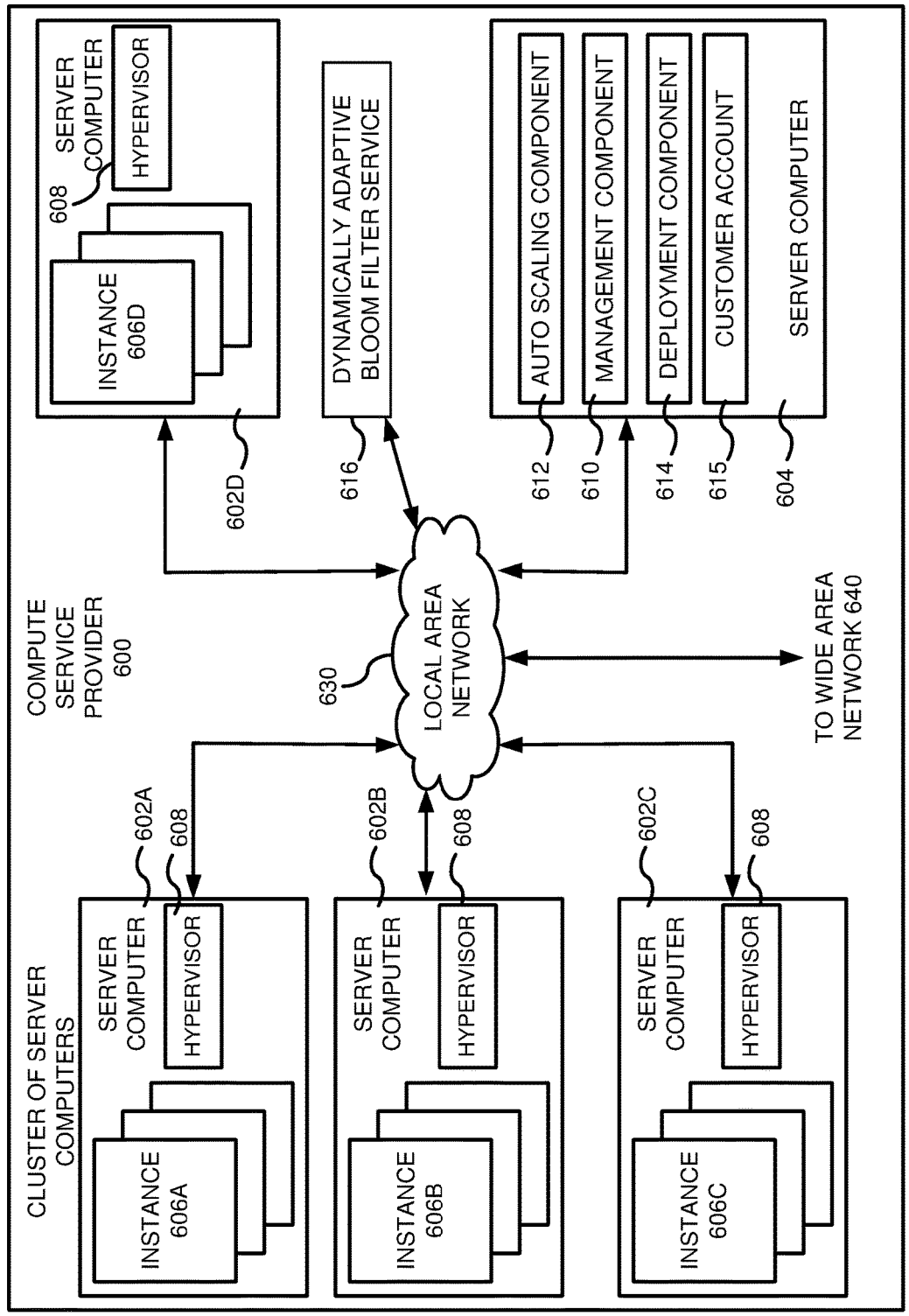
FIG. 6 is an example system diagram depicting a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise Clos networks or other types of multi-tiered network fabrics. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and network devices can be utilized to interconnect the various computing systems disclosed herein.

A dynamically adaptive Bloom filter service 616 can be included in the compute service provider 600 to perform data lookup operations for data stored in one or more of the server computers 602. One or more Bloom filters managed by the service 616 can be populated using records stored in one or more of the server computers 602. Lookup requests and feedback messages can be received by the service 616 via the local area network 630. In some scenarios, lookup requests and feedback messages can be received from external sources via the wide area network 640. Additionally or alternatively, lookup requests and/or feedback messages can be received from one or more of the instances 606.

Although the dynamically adaptive Bloom filter service 616 is depicted in FIG. 6 as separate from the server computers 602, in some embodiments, the service 616 can comprise one or more components of one or more of the server computers 602. For example, the service 616 can be a part of one or more of the instances 606.

Figure 7:
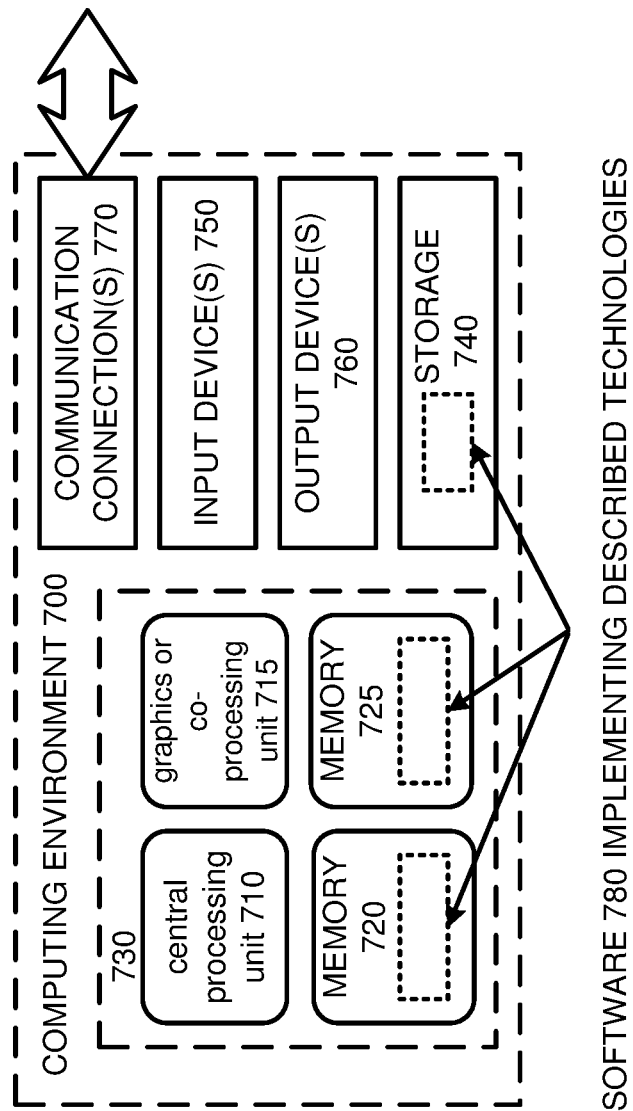
FIG. 7 is a diagram depicting a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). In at least some embodiments, the memory 720, 725 can store all or part of one or more dynamically adaptive Bloom filters, as described herein.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

In at least some embodiments, the computing environment 700 can be used as a computing device, service, server, and/or client as described herein.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein. In at least some embodiments, the tangible storage 740 can store all or part of one or more dynamically adaptive Bloom filters, as described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer-implemented method, comprising:
transmitting a record lookup request, the lookup request comprising a record identifier and a request identifier, the request identifier can be used to uniquely identify the request, from a client computing device to a server computing device;
responsive to receiving the record lookup request, performing a first Bloom filter lookup operation at the server computing device using the record identifier and an active Bloom filter;
performing a second Bloom filter lookup operation at the server computing device using the record identifier and an inactive Bloom filter, wherein the inactive Bloom filter is different from the active Bloom filter;
generating a Bloom filter lookup result based on a result of the first Bloom filter lookup operation using the active Bloom filter, transmitting a response to the client computing device from the server computing device based on the Bloom filter lookup result, wherein the response indicates that the record potentially exists in a database,
storing the request identifier in association with the Bloom filter lookup result;
responsive to receiving the response at the client computing device, attempting to retrieve the record from the database;
determining that the record does not exist in the database;
transmitting, from the client computing device to the server computing device, a feedback message comprising the request identifier and an indicator specifying that the record does not exist in the database, wherein the feedback message is used by the server computing device to determine whether the attempt to retrieve the record from the database is successful or unsuccessful and whether the stored Bloom filter lookup result is a false-positive; and
responsive to receiving the feedback message at the server computing device, retrieving the stored Bloom filter lookup result using the request identifier and updating accuracy scores associated with the active and inactive Bloom filters based on the feedback message.

2. The method of claim 1, further comprising:
determining that an accuracy score for the active Bloom filter is below a specified threshold; and
based on the determining, deactivating the active Bloom filter and activating the inactive Bloom filter.

3. The method of claim 1, wherein:
the server computing device comprises a plurality of Bloom filters associated with record types, wherein the active Bloom filter and the inactive Bloom filter are associated with a particular record type of the record types;
the record lookup request further comprises the particular record type; and
the method further comprises selecting the active and inactive Bloom filters for processing the record lookup request based on the particular record type.

4. The method of claim 1, wherein:
the active Bloom filter and the inactive Bloom filter are associated with different hash functions; and
the method further comprises:
selecting the different hash functions at random, and
generating the active Bloom filter and the inactive Bloom filter using the different hash functions.

5. The method of claim 1, wherein a web browser of the client computing device is used to perform the transmitting the record lookup request, the receiving the response from the server computing device, the attempting to retrieve the record from the database, the determining that the record does not exist in the database, or the transmitting the feedback message to the server computing device.

6. A computing device, comprising:
one or more processors implementing a Bloom filter; and
a memory storing instructions that, when executed by the one or more processors, cause the computing device to perform operations, the operations comprising:
receiving a Bloom filter lookup request from a client computing device, wherein the Bloom filter lookup request comprises a record identifier and a request identifier;
using the Bloom filter and the record identifier to generate a Bloom filter lookup result, wherein the Bloom filter lookup result indicates that a record associated with the record identifier is potentially in a record set;
transmitting the Bloom filter lookup result to the client computing device;
storing the request identifier in association with the Bloom filter lookup result;
receiving, from the client computing device, a feedback message comprising the request identifier and an indicator specifying whether the record is in the record set, wherein the feedback message is used to determine whether an attempt to retrieve the record from the record set is successful or unsuccessful and whether the stored Bloom filter lookup result is a false-positive; and
retrieving the stored Bloom filter lookup result using the request identifier and updating an accuracy score associated with the Bloom filter based on the feedback message.

7. The computing device of claim 6, wherein:
the Bloom filter is an active Bloom filter;
the one or more processors further implement an additional, inactive Bloom filter; and
the operations further comprise:
using the inactive Bloom filter and the record identifier to generate another Bloom filter lookup result for the record, and
updating another accuracy score associated with the inactive Bloom filter based on the feedback message.

8. The computing device of claim 7, wherein the operations further comprise:
determining, using the accuracy scores for the active Bloom filter and the inactive Bloom filter, that the inactive Bloom filter is more accurate than the active Bloom filter;
deactivating the active Bloom filter; and
activating the inactive Bloom filter.

9. The computing device of claim 8, wherein the determining that the inactive Bloom filter is more accurate than the active Bloom filter comprises determining that the inactive Bloom filter has a lower false-positive rate than the active Bloom filter.

10. The computing device of claim 7, wherein the active Bloom filter and the inactive Bloom filter are associated with different, randomly selected hash functions.

11. The computing device of claim 6, wherein:
the record set comprises a database table in a database;
the Bloom filter lookup result indicates that the record is potentially stored in the database table;
the feedback message indicates that the record is not stored in the database table; and
the updating the accuracy score for the Bloom filter comprises decreasing the accuracy score for the Bloom filter.

12. The computing device of claim 6, wherein:
the computing device comprises a plurality of Bloom filters associated with different record types;
the Bloom filter lookup request further comprises a record type; and
the operations further comprise selecting the Bloom filter, from the plurality of Bloom filters, based on the record type in the Bloom filter lookup request.

13. The computing device of claim 6, wherein the accuracy score is based on a false-positive rate of the Bloom filter and an average response time of the Bloom filter.

14. A computer-implemented method for creating a dynamically adaptive Bloom filter, the method comprising:
creating a plurality of Bloom filters, wherein the plurality of Bloom filters are associated with different hash functions and separate accuracy scores; and
populating the plurality of Bloom filters using a set of records, wherein populating the plurality of Bloom filters with a record in the set of records comprises, for each of the Bloom filters in the plurality of Bloom filters:
checking a Bloom filter for the existence of the record,
if the Bloom filter indicates that the record exists, then decreasing the accuracy score associated with the Bloom filter, and
otherwise, adding an entry to the Bloom filter based on the record;
selecting a Bloom filter, of the plurality of Bloom filters, to be an active Bloom filter based on the separate accuracy scores associated with the plurality of Bloom filters, wherein the active Bloom filter is used to process Bloom filter lookup requests for the set of records, wherein each lookup request comprises a record identifier and a request identifier;

receiving a request to look up a second record;

checking the plurality of Bloom filters for the existence of the second record to generate a Bloom filter lookup result;

transmitting a response indicating whether the second record is in the set of records, based on the Bloom filter lookup result;

storing the request identifier in association with the Bloom filter lookup result;

receiving a feedback message comprising the request identifier and an indicator specifying whether the second record actually exists in the set of records, wherein the feedback message is used to determine whether an attempt to retrieve the second record from the set of records is successful or unsuccessful and whether the stored Bloom filter lookup result is a false-positive; and retrieving the stored Bloom filter lookup result using the request identifier and updating the accuracy scores for the plurality of Bloom filters based on the feedback message.

15. The method of claim 14, further comprising:
based on the updated accuracy scores, marking the active Bloom filter as inactive and selecting another Bloom filter, of the plurality of Bloom filters, to be an active Bloom filter.

16. The method of claim 14, wherein:
the records in the set of records are associated with a record type, of a plurality of record types; and
the active Bloom filter is marked as active for the record type; and
the other Bloom filters are marked as inactive for the record type.

17. The method of claim 14, wherein the creating a plurality of Bloom filters comprises randomly selecting Bloom filter parameters for at least some of the Bloom filters, wherein the Bloom filter parameters for a Bloom filter comprise:
a number of hash functions to be used with the Bloom filter;
a type of hash function for each of the hash functions to be used with the Bloom filter; or
a number of bits in a bit array of the Bloom filter.

* * * * *